(12) United States Patent
Bhakta et al.

(10) Patent No.: US 7,443,913 B2
(45) Date of Patent: Oct. 28, 2008

(54) HIGH SPEED DECISION FEEDBACK EQUALIZER

(75) Inventors: Bhavesh G. Bhakta, Richardson, TX (US); Sridhar Ramaswamy, Plano, TX (US); Robert F. Payne, Allen, TX (US); Song Wu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 698 days.

(21) Appl. No.: 10/777,612

(22) Filed: Feb. 12, 2004

(65) Prior Publication Data

US 2005/0180498 A1    Aug. 18, 2005

(51) Int. Cl.
*H03K 5/159* (2006.01)

(52) U.S. Cl. .................. 375/233; 375/147; 375/229; 375/230; 375/231; 375/232; 375/234; 375/248; 375/371; 375/348; 381/103; 708/323; 333/18; 333/28

(58) Field of Classification Search .......... 375/147, 375/229, 233, 232, 248, 230, 231, 371, 348, 375/355, 350, 235, 234; 333/18, 28; 381/103; 708/323
See application file for complete search history.

(56) References Cited

U.S. PATENT DOCUMENTS

| 6,144,697 | A  | * | 11/2000 | Gelfand et al. ............... 375/233 |
| 7,092,437 | B2 | * | 8/2006  | Chen et al. .................... 375/231 |
| 7,151,796 | B2 | * | 12/2006 | Allpress et al. ............. 375/229 |
| 2004/0076228 | A1 | * | 4/2004 | Park et al. ..................... 375/233 |
| 2005/0135471 | A1 | * | 6/2005 | Tonietto et al. ............. 375/233 |
| 2006/0233291 | A1 | * | 10/2006 | Garlepp et al. .............. 375/355 |

\* cited by examiner

*Primary Examiner*—Shuwang Liu
*Assistant Examiner*—Helene Tayong
(74) *Attorney, Agent, or Firm*—Alan K. Stewart; W. James Brady; Frederick J. Telecky, Jr.

(57) ABSTRACT

An equalizer comprises a sampler, a filter, and a summer. The sampler samples a signal indicative of an input communication signal to determine digital decision output signals having a communication device data rate. The filter receives digital decision output signals from the sampler and generates equalization signals therefrom. The summer couples to the sampler and the filter and combines together the input communication signal with the equalization signals. Further, a plurality of clocks control timing associated with the sampler. These clocks have frequencies that are less than the predetermined data rate of the digital decision output signals.

23 Claims, 6 Drawing Sheets

HIGH SPEED DECISION FEEDBACK EQUALIZER

BACKGROUND OF THE INVENTION

1. Technical Field

The present subject matter relates in general to data receivers and more particularly, to decision feedback equalizers used in receivers.

2. Background Information

In many digital communication systems (e.g., network switches), a source generates digital information, such as data, audio, or video, and transmits such information to one or more receivers. The digital information bits may be divided into blocks that define a discrete alphabet of symbols. These symbols may be used to modulate a carrier's frequency, amplitude or phase.

The digital bit stream is transmitted across a communication medium (e.g., a copper backplane) and detected by a receiver. Such communication media (also referred to as the "channel") may cause the transmitted signal to become distorted as it propagates across the channel. As a result, symbols may smear across multiple symbol boundaries, i.e., one symbol may bleed over into other symbols. This phenomenon is referred to as inter-symbol interference ("ISI"). Further, noise may be added to the received signal from transmitter and receiver component imperfections, and from other sources along the propagation path.

The receiver attempts to receive and correctly reproduce the originally transmitted bit stream. That is, a transmitted logic "1" should be accurately determined to be a "1" by the receiver and, similarly, a transmitted logic "0" should be determined to be a "0" upon reception. Some receivers may include an equalizer to mitigate the effects of ISI and noise caused by the channel and other effects. Because the exact channel characteristics may not be known apriori at the receiver, the equalizer may be implemented with adaptive methods. Data rates continue to trend upward and are approaching the upper limit of what is possible with presently preferred types of semiconductor technology (e.g., CMOS). Further, many applications benefit from, if not demand, lower power consumption equipment. The upward trend in data rates in the face of expectations for lower power consumption devices imposes considerable design challenges for faster, lower power receivers.

BRIEF SUMMARY

In accordance with at least some embodiments of the invention, an equalizer and associated method comprise a sampler, a filter, and a summer. The sampler samples a signal indicative of an input communication signal to determine digital decision output signals having a predetermined data rate. The filter receives digital decision output signals from the sampler and generates equalization signals therefrom. The summer couples to the sampler and the filter and combines together the input communication signal with the equalization signals. Further, a plurality of clocks control timing associated with the sampler. These clocks have frequencies that are less than a data rate of a communication device.

In accordance with other embodiments of the invention, an equalizer and associated method comprise a sampler, a filter, a summer, and a clock circuit. The sampler that samples a signal indicative of an input communication signal to determine digital decision output signals. The filter receives digital decision output signals from the sampler and generates equalization signals therefrom. The summer couples to the sampler and the filter. The summer combines together the input communication signal with the equalization signals. The clock circuit couples to the filter and the sampler. The clock circuit generates a plurality of inter-symbol interference ("ISI") cancellation clock signals that operate the filter from a set of quadrature clocks used to operate the sampler.

In accordance with other embodiments of the invention, an equalizer and associated method comprise an input amplifier, a sampler, a filter, and a summer. The input amplifier receives an input communication signal. The sampler samples a signal indicative of the input communication signal to generate digital decision output signals. The filter receives digital decision output signals from the sampler and generates equalization signals therefrom. The summer couples to the sampler and the filter. The summer combines together the input communication signal with the equalization signals. The equalizer includes a sensitivity test process in which the at-speed sensitivity of the equalizer can be determined. The process includes disabling the input amplifier, providing a predetermined set of tap coefficients to the filter, determining if the sampler generates a repeating pattern associated with the set of tap coefficients, and repeating the sensitivity test process with other predetermined sets of tap coefficients until the sampler no longer determines the repeating pattern associated the set of tap coefficients provided to the filter.

Notation and Nomenclature

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
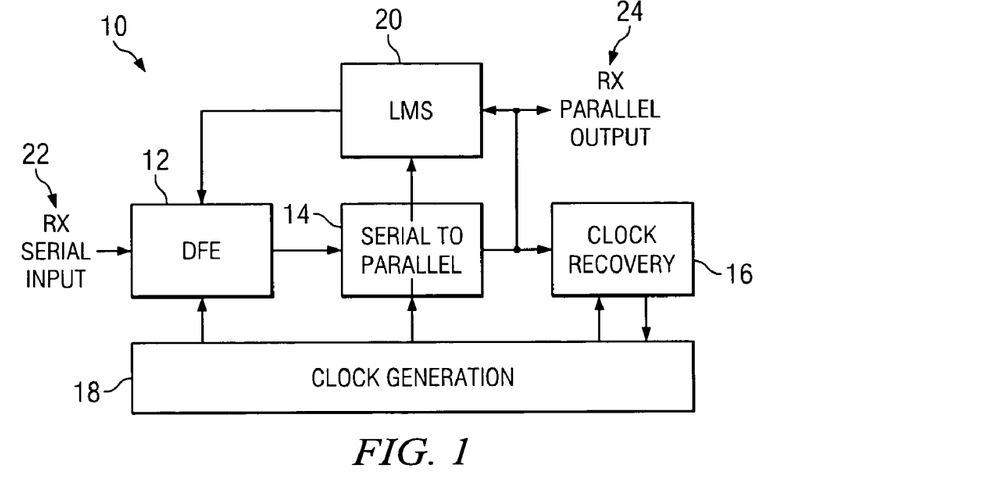
FIG. 1 shows a receiver incorporating a decision feedback ("DFE") equalizer in accordance with the preferred embodiment of the invention.

FIG. 1 shows an exemplary embodiment of a receiver 10. As shown, the receiver comprises a decision feedback equalizer ("DFE") 12, serial-to-parallel converter 14, clock recovery circuit 16, clock generation circuit 18, and least mean square ("LMS") coefficient generator 20. Input data 22 to the receiver, is received as a serial bit stream (RX) into the DFE 12. The DFE determines whether each bit is a 0 or 1 and produces an output bit stream to the serial-to-parallel converter 14. The serial-to-parallel converter 14 converts the input bit stream from the DFE 12 into parallel data which then represents the output 24 of the receiver. The parallel output data from the receiver can then be used by host logic (not shown) to which the receiver couples. The DFE is an adaptive equalizer and operates in concert with filter coefficients generated and provided by the LMS coefficient generator 20. In general, the DFE 12 reduces inter-symbol interference ("ISI"). The LMS coefficient generator 20 generates the coefficients dynamically based on the parallel data and feeds the coefficients back into the DFE. The DFE uses the coefficients in a multi-tap filter to compensate for ISI. The coordinated activity of the clock recovery circuit 16 and the clock generator 18 produce appropriate clock signals to control the operation of the DFE. These and other features will be discussed below.

Figure 2:
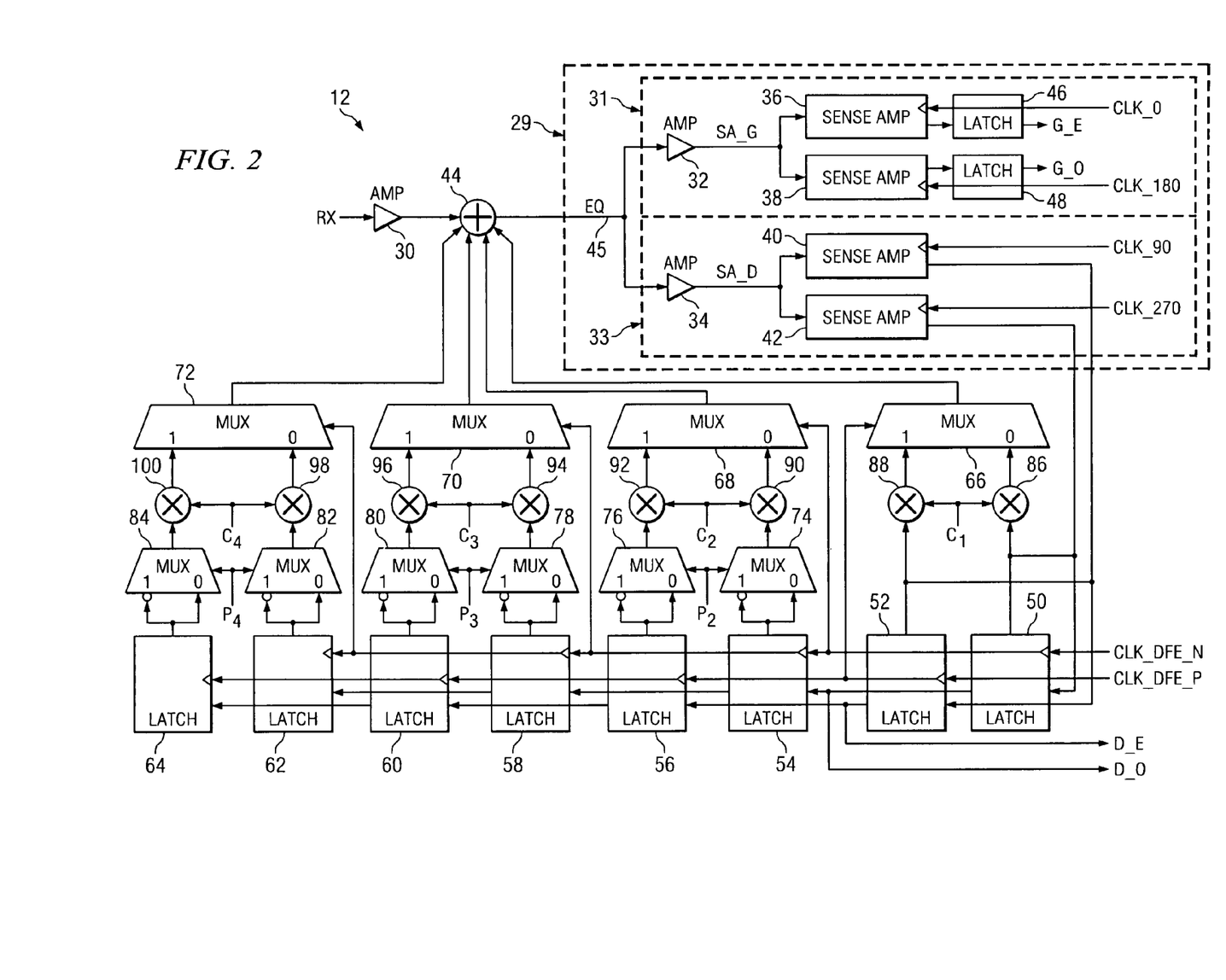
FIG. 2 depicts a preferred embodiment of the DFE of FIG. 1.

FIG. 2 shows a preferred embodiment of the DFE 12. As shown, the OFE 12 comprises amplifiers 30-34, sense amplifiers 36-42, summer 44, latches 46-64, multiplexers 66-84, and multipliers 86-100. Input serial data (represented as "RX") is received into the input amplifier 30. The output of the input amplifier 30 is provided to the summer 44 which sums together the output signals of the four multiplexers 66-72. The output of the summer 44 (at the "EQ" node 45) is provided to a sampler 29 that comprises amplifiers 32, 34, sense amplifiers 36-42 and latches 46, 48. More specifically, the output of summer 44 is provided to both amplifiers 32 and 34 in separate processing paths 31 and 33. Processing path 31 comprises amplifier 32, sense amplifiers 36, 38 and latches 46, 48. Processing path 33 comprises amplifier 34 and sense amplifiers 40 and 42. Processing path 31 is used to process gradient bits from the input RX bit stream and processing chain 33 is used to process data bits from the input bit stream. Sense amplifier 36 in path 31 is used to sense even gradient bits, while sense amplifier 38 is used to sample odd gradient bits. Similarly, sense amplifiers 40 and 42 are used to sample even and odd data bits, respectively.

The DFE 12 shown in FIG. 2 comprises a 4-tap DFE filter. Tap 1 is represented by multipliers 86, 88 and multiplexer 66. Tap 2 is represented by multipliers 90, 92 and multiplexer 68. Tap 3 is represented by multipliers 94, 96 and multiplexer 70. Tap 4 is represented by multipliers 98, 100 and multiplexer 72. Although a 4-tap filter is used in the embodiment of FIG. 2, in other embodiments a different number of taps may be implemented. The coefficients for the taps are shown as C1, C2, C3, and C4 and are computed and provided by the LMS coefficient generator 20. The latches 50-64 generally function as shift registers to shift the feedback bits from sense amplifiers 40 and 42 from one tap to the next to cancel the effects of interference from one symbol on one or more other symbols.

Figure 3:
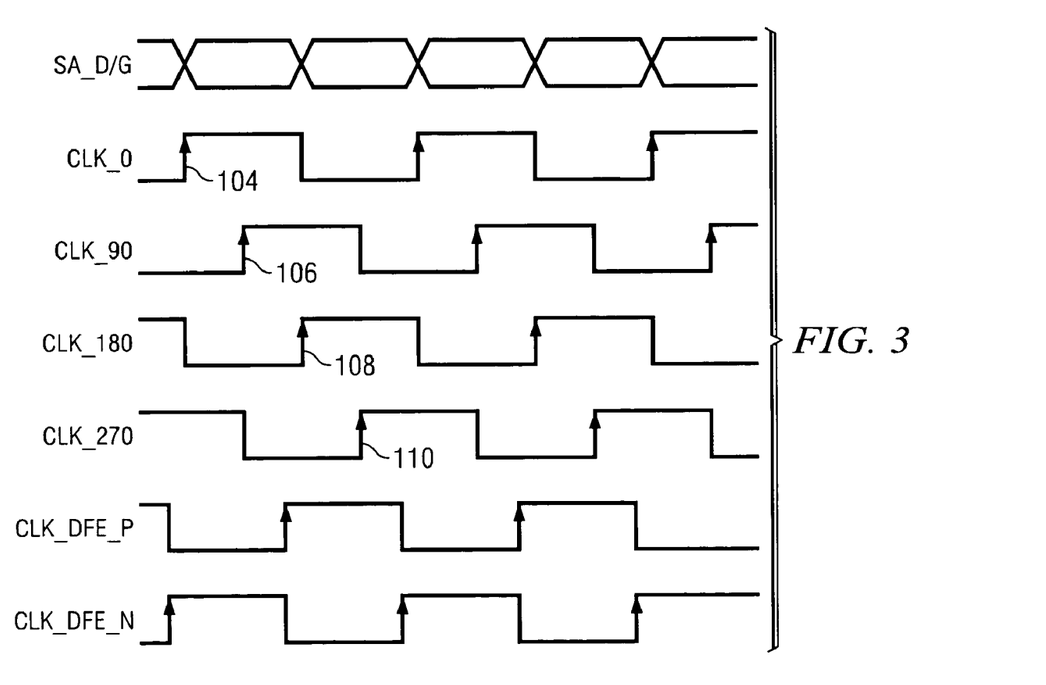
FIG. 3 illustrates the timing relationship between the half baud, quadrature clocks used in the DFE of FIG. 2.

Preferably, the clocks that control the timing of the sampler 29 have frequencies that are less than the rate of the data out of the equalizer 12. The preferred embodiment of the DFE 12 shown in FIG. 2 uses half baud, quadrature clock signals to facilitate high speed data transfers. As such, the sampling clocks have frequencies that are one-half the data rate of the DFE 12. The four quadrature clocks are shown in FIG. 2 as CLK_0, CLK_90, CLK_180, and CLK_270 representing four clocks with phase differences of 0, 90, 180 and 270 degrees, respectively. The timing relationship among these four quadrature clocks are shown in FIG. 3. As can be seen, the CLK_0 and CLK_180 are out of phase by 180 degrees with respect to each other. Similarly, the CLK_90 and CLK_270 are out of phase by 180 degrees with respect to each other and out of phase by 90 degrees with respect to the 0 and 180 clocks. In the embodiments disclosed herein, rising edges (e.g., 104, 106, 108, 110) of the clocks are used to sample the input gradient and data signals from amplifiers 32 and 34 (SA_G and SA_D).

Referring again to FIG. 2, the CLK_0 and CLK_180 clocks preferably are used to clock sense amplifiers 36 and 38, while the CLK_90 and CLK_180 clocks are used to clock sense amplifiers 40 and 42. As such, the gradient sampling sense amplifiers 36, 38 use a pair of opposite polarity clocks as do the data sampling sense amplifiers 40, 42. As illustrated in FIG. 3 and described above, the clocks used to sample data are out of phase by 90 degrees with respect to the clocks used to sample the gradient bits. As a result of using half-baud rate quadrature clocks, in the span of one gradient clock cycle, two gradient samples can be obtained. Similarly, in the span of one data clock cycle, two data samples can be obtained. Moreover, data can be received at a rate that is twice the frequency of any of the clocks. This type of clock mechanism advantageously permits slower clocks to be used relative to the target data rate. For example, 3-gigahertz clocks can be used to transmit and receive data at a rate of 6 gigabits per second.

In general, sense amplifiers undesirably "kickback" differential and common mode noise onto their inputs when sampling clock transitions. The preferred embodiment of FIG. 2 shows that the sense amplifiers 36-42 are divided into separate processing paths 31, 33 as noted above. By separating the gain stages as shown and providing one pair of clocks (CLK_0/180) for the gradient stage and the other pair of clocks (CLK_90/270) for the data stage, the impact of kickback is reduced.

Figure 4:
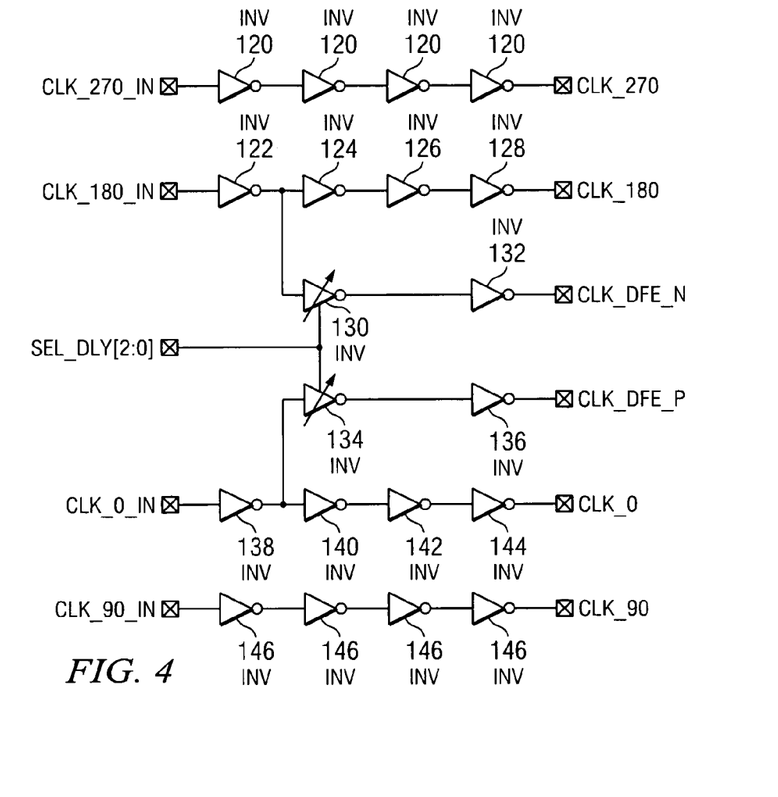
FIG. 4 shows a preferred embodiment of the generation of the inter-symbol interference cancellation clocks based on the quadrature clocks.

Referring to FIGS. 2, 3, and 4, a pair of ISI cancellation clocks, CLK_DFE_N and CLK_DFE_P, are used to coordinate the timing of the feedback cancellation signals into the filter taps. In accordance with the preferred embodiments of the invention, the ISI cancellation clocks are derived from the quadrature clocks (CLK_0/90/180/270). The clock circuit of FIG. 4 depicts an exemplary embodiment of how the ISI cancellation clocks CLK_DFE_N and CLK_DFE_P are generated or otherwise based on the quadrature clocks. The embodiment of FIG. 4 includes a plurality of inverters 120-146 used as delay cells. That is, each inverter causes the input signal to be inverted and produced as an output signal following a time delay associated with the implementation of the inverter. The input signals to the embodiment shown in FIG. 4 comprise the four quadrature clocks CLK_0_IN, CLK_90_IN, CLK_180_IN, and CLK_270_IN and a select delay code represented as SEL_DLY[2:0]. The output clock signals from the circuit comprise delayed versions of the quadrature clocks (CLK_0, CLK_90, CLK_180, and CLK_270) that are used to sample the gradient and data bits in FIG. 2. The CLK_DFE_N and CLK_DFE_P clocks are also generated by the inverter network of FIG. 4. The CLK_0_IN, CLK_90_IN, CLK_180_IN, and CLK_270_IN clocks are each passed through four inverters. Inverters 120 and 146 are used for the 270 and 90 clocks, respectively, and inverters 122-128 and 138-144 are used for the 180 and 0 clocks, respectively. With an even number of inverters, the logic level of the quadrature clocks remains the same, but the clocks are delayed by the combined time delay associated with four serially connected inverters. In other embodiments, the number of inverters can be other than four.

The CLK_DFE_N clock is derived from the CLK_180_IN through inverters 122, 130 and 132 as shown. Inverter 130 comprises an inverter with a variable time delay. The amount of delay imposed by inverter 130 is dictated by the SEL_DLY [2:0] code. The SEL_DLY[2:0] code is a three bit code in the preferred embodiment thereby permitting the selection of eight different delay settings. In other embodiments, the select delay code may have other than three bits (i.e., one or more) to permit other than 8 selectable delay settings. The CLK_DFE_P clock is derived from the CLK_0_IN clock through inverters 138, 134, and 136 with inverter 134 also being a variable delay inverter and controlled via the SEL_DLY[2:0] code.

The following discussion addresses how the magnitude of the variable time delay is determined. In accordance with at least some embodiments, the amount of time delay is determined during execution of a calibration mode. The calibration mode may be entered at any suitable time such as at startup or reset. Referring to FIG. 2, upon entering the calibration mode, the amplifier 30 preferably isolates the RX input from the EQ node 45. The first DFE coefficient (C1) is set to its maximum value while C2-C4 are set to zero. Setting the coefficients in this manner causes a 1010 . . . repeating pattern to be generate at the EQ node 45. The 1010 repeating pattern is amplified by amplifiers 32 and 34 and sampled by sense amplifiers 36-42. The alignment of the cancellation clocks CLK_DFE_N and CLK_DFE_P to the sampling clocks CLK_0, CLK_90, CLK_180, and CLK_270 determines the output of the sense amplifiers. If the cancellation clocks' rising edges occur too early relative to CLK_0 and CLK_180, then the resulting gradient sample will not equal the subsequent data sample. Conversely, if the cancellation clocks occur too late, then the output gradient sample will equal the subsequent data sample. This information is used to move the cancellation clocks to the proper position. The SEL_DLY[2:0] bits are updated based on the early/late votes in a 16-bit wide register.

Figure 5:
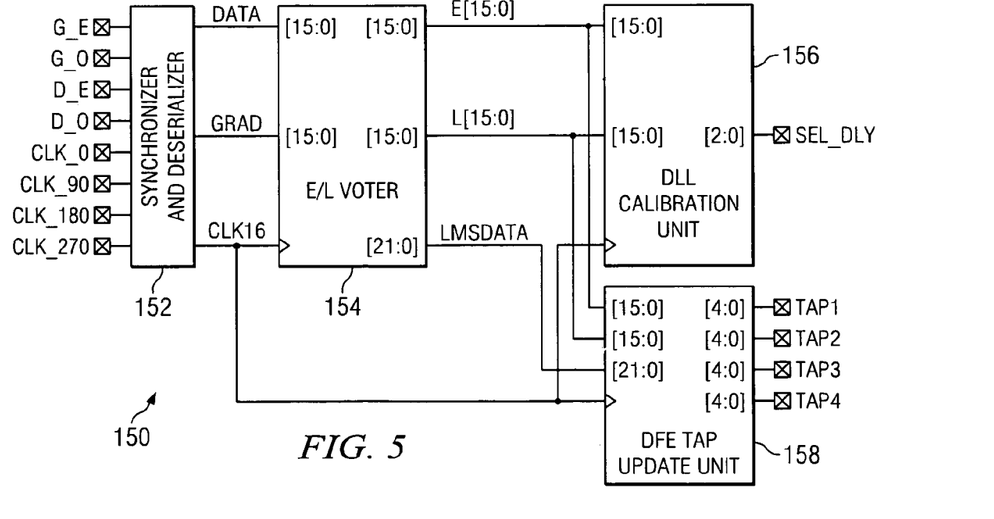
FIG. 5 illustrates a circuit usable to generate a delay code for use in the embodiment of FIG. 4.

FIG. 5 illustrates the computation of votes that drive the SEL_DLY[2:0] bits. FIG. 5 shows an exemplary embodiment of a circuit 150 usable in DFE 10 to calibrate the SEL_DLY [2:0] delay code to properly time the cancellation clocks. As shown, the circuit 150 comprises a synchronizer and deserializer 152, early/late ("E/L") voter 154, a delay locked loop ("DLL") calibration unit 156 and a DFE tap update unit 158. The synchronizer and deserializer 152 receives the even and odd data and gradient samples and synchronizes such samples to CLK_270. The synchronizer and deserializer 152 then de-serializes the data and gradient samples into 16-bit units which are synchronized to a divided down clock (CLK16) that $1/16^{th}$ the frequency of any of the quadrature clocks. The 16 bits of data and gradient samples are then sent to the E/L voter 154. The E/L voter 154 determines the early and late votes based on the samples. The following algorithm is used for early/late vote computation. If the current data sample equals the next gradient sample, then ISI cancellation clocks are determined to have occurred late. Otherwise, the ISI cancellation clocks are determined to have occurred early. Early votes are encoded as E[15:0] and late votes are encoded as L[15:0]. An early vote for a particular sample i is encoded as E[i]=1 and L[i]=0. A late vote for sample i is encoded as E[i]=0 and L[i]=1. The 16 early and 16 late votes are provided to the DLL calibration unit.

Additional data and gradient bits are registered so that preferably 22 bits of data and 16 bits of early and late votes are output from the E/L voter 154. The early (E) and late (L) votes are provided to the DLL calibration unit 156 to update The SEL_DLY signal. The total number of late votes being greater than the total number of early votes indicates that the sampling clocks (CLK_0, CLK_90, CLK_180, and CLK_270) are late with respect to CLK_DFE_N and CLK_DFE_P. As a result, the DLL calibration unit 156 increases the SEL_DLY code by a predetermined amount (e.g., one delay unit). Preferably, the delay through the delay cells 130, 134 increases monotonically with increases in the SEL_DLY code. The increased delay cause the signal on the EQ node to shift in time, which in turn leads to a different sampling point. Eventually, the calibration results in a final SEL_DLY code that causes the gradient clocks (CLK_0, CLK_180) to sample at the edge of the "eye".(i.e., zero-crossing) while the data clocks (CLK_90, CLK_270) sample at the center of the eye.

Figure 6A:
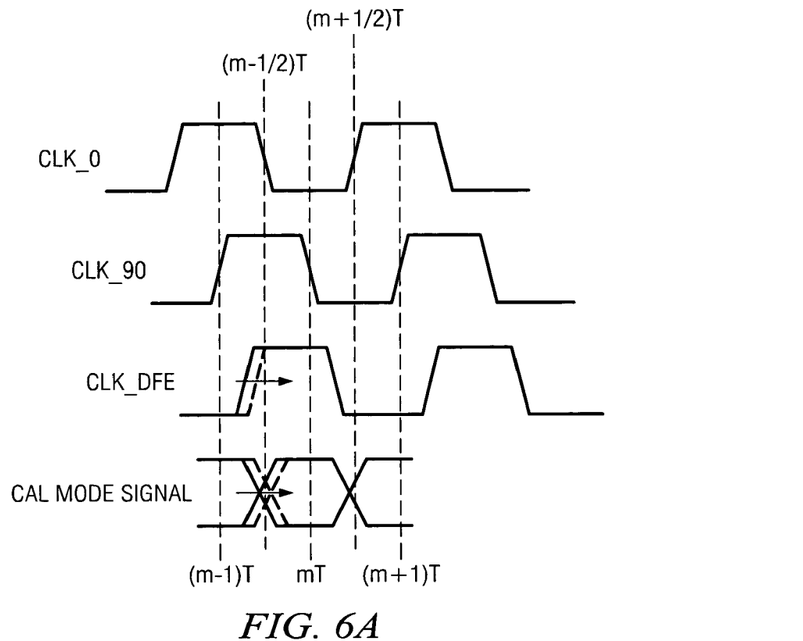
FIGS. 6A and 6B illustrate exemplary calibration mode timing diagrams.
Figure 6B:
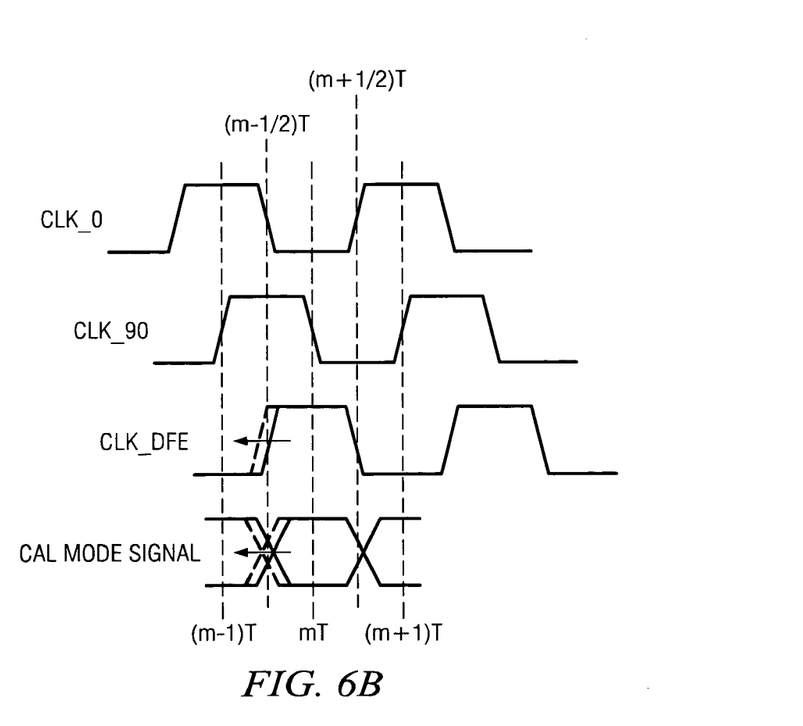

FIGS. 6A and 6B illustrate two cases of samples being late or early and the resulting action on the SEL_DLY code to re-center the clocks. In FIG. 6A, the phase sampling clock CLK_0 is late while in FIG. 6B, CLK_0 is early. The horizontal arrows indicate the required corrections to the ISI cancellation clock (CLK_DFE).

The architecture of DFE 12 also provides a mode for precise characterization of sensitivity of the sense amplifiers and at-speed testing of the analog circuits. In this mode, as explained below, the DFE taps are fixed at certain coefficient values while the input amplifier 30 is shut-off, thereby isolating the EQ node from the input RX signal. The DFE will maintain a certain repeating known pattern associated with each set of selected coefficients. The algorithm provided below specifies how the tap coefficients are selected for this mode.

In accordance with the preferred embodiment of the invention, the following criteria should be met during this mode when selecting the tap coefficients:

The sum of the coefficients should be greater than or equal to one;

At least one negative tap coefficient should be included;

The minimum value should be 1 LSB for maximizing the range of values that may be tested; and The number of transitions within the repeating pattern should be maximized to achieve at-speed testing.

An exemplary set of coefficients along with the minimum/ maximum range of generated values is provided in Table 1 below.

TABLE I

| TAPS <1:4> | REPEATING PATTERN | MAX VALUE | MIN VALUE |
|---|---|---|---|
| 1, 0, 0, 0 | 1010 . . . | 30 LSB | 1 LSB |
| 0, 1, 0, 0 | 11001100 . . . | 14 LSB | 1 LSB |
| 0, 0, 1, 0 | 111000111000 . . . | 7 LSB | 1 LSB |
| 0, 0, 0, 1 | 1111000011110000 . . . | 7 LSB | 1 LSB |
| 0, −1, 1, 1 | 1111000011110000 . . . | 7 LSB | 1 LSB |

TABLE I-continued

| TAPS <1:4> | REPEATING PATTERN | MAX VALUE | MIN VALUE |
|---|---|---|---|
| 2, 1, −1, 1 | 1101001011010010 . . . | 7 LSB | 1 LSB |
| 0, 1, −1, 1 | 100100 . . . | 7 LSB | 1 LSB |
| 1, 1, −2, 1 | 110110 . . . | 3 LSB | 1 LSB |
| 1, 1, 1, −2 | 11101110 | 3 LSB | 1 LSB |
| 2, 1, −1, −1 | 110110 | 7 LSB | 1 LSB |

Figure 7:
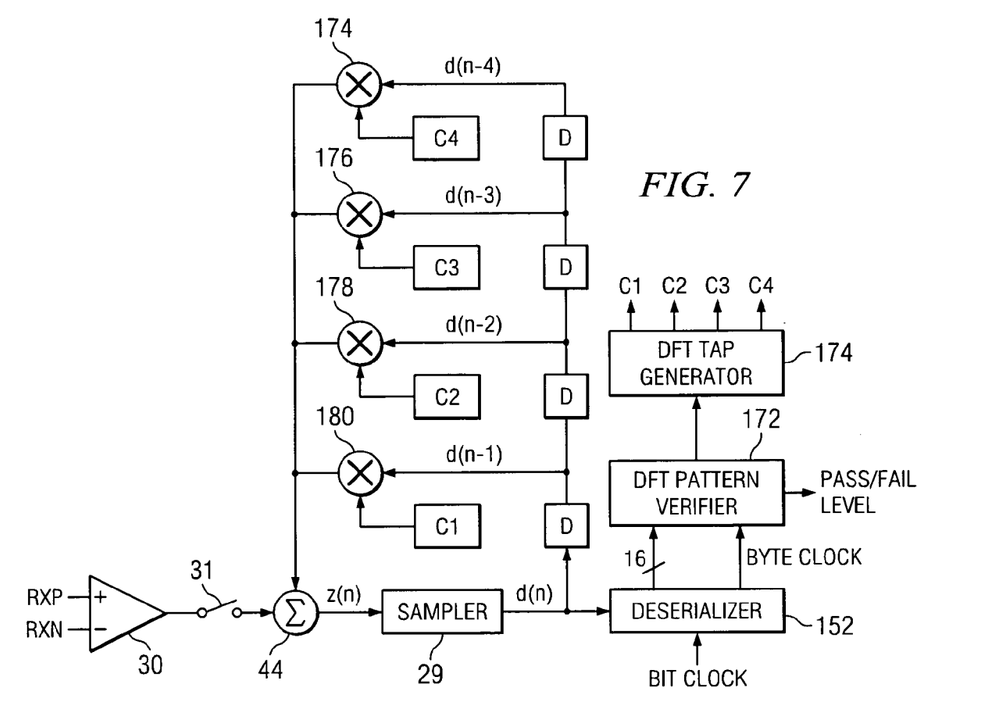
FIG. 7 depicts a preferred technique for determining the at-speed sensitivity of the DFE's sampler.

For each set of coefficients, the selected code is swept from the maximum value to the minimum value at which the output of the DFE still maintains the pattern associated with the code (see Table 1 above). FIG. 7 provides an exemplary schematic to illustrate the operation of this mode.

Referring now to FIG. 7, upon entering this mode (which may occur during initialization), the amplifier 30 is shut off, represented conceptually by the open switch 31. Upon shutting off amplifier 30, the differential inputs (represented as RXP and RXN) are isolated from the summing node 44. The sampler 29 samples the signal z(n) which represents the sum of the feedback signals from multipliers 174-180. In general, z(n) is the analog input signal to the sampler 29 at time n. The multipliers 174-180 are associated with the various taps and represent some or all of the multipliers 86-100 in FIG. 2. The sampler 29 samples z(n) to determine decision d(n) such that if z(n) is greater than 0, then d(n)=+1. If z(n), however, is less than 0, then d(n)=−1. Deserializer 152 receives the decisions from the sampler 29 and generates 16-bits of data and a synchronizing byte clock. The 16-bits of data and the byte clock are provided to a pattern verifier 172 which is programmed with, or otherwise has access to, the repeating patterns that should result from the imposition of each set of tap coefficients from Table 1. If the correct repeating pattern is detected by the pattern verifier 172 for a given set of tap coefficients, the pattern verifier instructs the tap generator 174 (which may be implemented in the LMS coefficient generator 20) to output the next set of tap coefficients. This process continues until the sampler 29 is unable to resolve the input z(n) correctly thereby resulting in errors being detected by the pattern verifier 172. At that point, the pattern verifier 172 outputs the sensitivity level at which the sampler 29 failed (or the immediately preceding sensitivity at which the sampler functioned correctly), thus providing a direct measure of the at-speed sensitivity of the sampler.

An exemplary equation governing the operation of the pattern generation of tap generator 174 during the sensitivity determination mode is $z(n) = -(c1*d(n-1) + c2*d(n-2) + c3*d(n-3) + c4*d(n-4))$ where z(n) is the analog signal input to the sampler at time n, c1-4 are the four tap coefficients and d(n01 . . . n−4) are the delayed decisions from the sampler 29. Because the taps have a finite word length, the maximum amplitude is determined by the maximum value that can be taken by the smallest tap while still maintaining the tap relationships given in column 1 of Table 1. For example, if C1=2, C2=1, C3=−1, C4=1, then the minimum amplitude of the signal into the sampler is 1*(digital-to-analog ("DAC") conversion factor), while the maximum amplitude (assuming C4max=7) will be 7*(DAC conversion factor). The TAP coefficients are converted into voltage levels in a DAC, with an exemplary conversion factor given by $V = C(i)*8$ mV. Hence, the sensitivity determination mode can be used to screen parts with a minimum sensitivity threshold in the range of 8 to 56 mV for the example above.

Referring again to FIG. 2, the architecture of DFE 12 provides an additional speed enhancement. As can be seen, the sense amplifiers 40 and 42 used to sample the data bits are coupled to the inputs of multipliers 86 and 88 without the use of intervening latches. As such, the speed of the DFE is increased through the feedback of raw sense amplifier outputs, instead of latched outputs, for the post-cursor symbol decisions. One or more embodiments of sense amplifiers 40, 42 (and, if desired, sense amplifiers 36, 38) suitable so as to avoid the use of output latches are disclosed in commonly owned patent application entitled "High Performance Sense Amplifiers," filed concurrently herewith.

Figure 8:
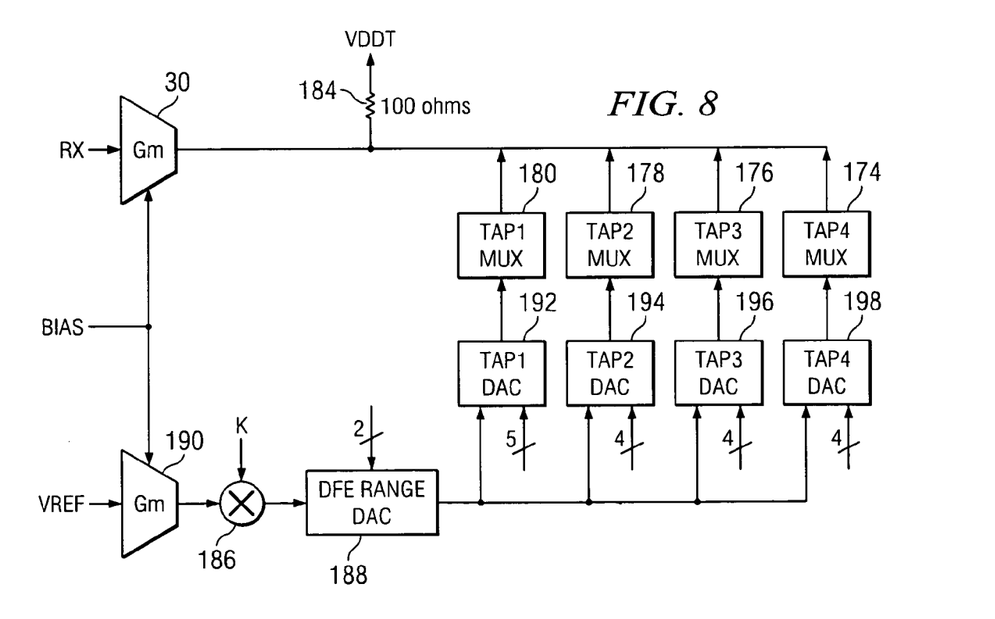
FIG. 8 shows a coefficient normalization circuit.

In general, the input amplifier 30 may have a large variation in its gain. Such gain variations may make pre-programmed DFE coefficients useless. In accordance with the preferred embodiments of the invention, DFE 12 attempts to reduce the effects of variations in gain of the input amplifier by normalizing the ISI cancellation currents to the input amplifier gain. In FIG. 8, the input amplifier 30 is represented by the transconductance (Gm) of the amplifier. FIG. 8 also shows a parallel VDDT/20 voltage driven Gm cell 190 that tracks variations of the input amplifier's Gm value. That is, a change in the gain of the input amplifier 30 will be associated with the same change in the cell 190. ISI cancellation currents are slaved to the output of the tracking GM cell 190 as described below.

The output of cell 190 is multiplied by a constant K at multiplier 186. The constant K is provided for scaling purposes and is application specific. The output from multiplier 186 is provided to digital-to-analog converter ("DAC") 188 which provides reference currents to each of four DACs 192-198 associated with each of the four taps. By varying the reference currents to the DACs 192-198, the conversion provided by the DACs can be controlled so as to track changes in the gain of the input amplifier 30, thereby normalizing ISI cancellation currents from the various taps to the gain of the input amplifier.

A possibility (albeit relative small) exists that the DFE 12 may "lock-up" given a certain combination of channel, DFE coefficients, input waveform and data decisions. In general, all or some of these variables can be modified to free the equalizer from this erroneous state. However, various problems exists with various of these approaches. Naturally, modifications to the channel itself are beyond the control of the receiver. Neither input waveform suppression nor asynchronous inhibition of the feedback signal guarantees an exit from the lock-up state. Further, the turn-on time for DFE coefficients may span hundreds of symbols thereby making this method of re-entry unattractive.

In accordance with the preferred embodiment of the invention, the DFE 12 uses differential signaling in the feedback path. With reference to FIG. 2, the outputs of the sense amplifiers 36-42 are differential in nature. The DFE's feedback is nullified if both the output signals (the "true" signal and its complement) have the same value—both high or both low. This property is exploited in the preferred embodiment to exit the DFE-on state (i.e., to turn off the DFE 12 and not provide equalization to the input RX signal). The DFE 12 is effectively turned off when each feedback tap's differential signals are equal. The preferred embodiment causes the DFE-on state to be exited by forcing the differential decisions signals to have the same value. Forcing zero differential decision values leads to zero feedback and exit from the DFE-on state. This approach preserves the tap currents and summation node common-mode during the DFE-off state thereby enabling rapid subsequent re-entry into the DFE-on state.

The first post-cursor decision circuit (tap 1), sense amplifier 40, 42 and latch 50, 52 enter a pre-charge state when their differential outputs are no longer required for ISI cancellation. In this pre-charge state, the differential decision output signals are effectively shorted together at the high logic state. Preserving this condition on first tap's decisions and propagating it to the other taps through the latches 50-64 effectively zeroes the feedback and accomplishes the exit from the DFE-on state. Exit synchronicity is attained through gating of the asynchronous control signal with the ISI cancellation clock. The aforementioned propagation of the zero feedback is depicted in the timing diagram of FIG. 9 at 206. The signal labeled "FLASH" is a signal that is driven high (low) when the DFE 12 should be turned off (on). The signal labeled "FLASH_SYNC" is a synchronized version of the FLASH signal.

Figure 9:
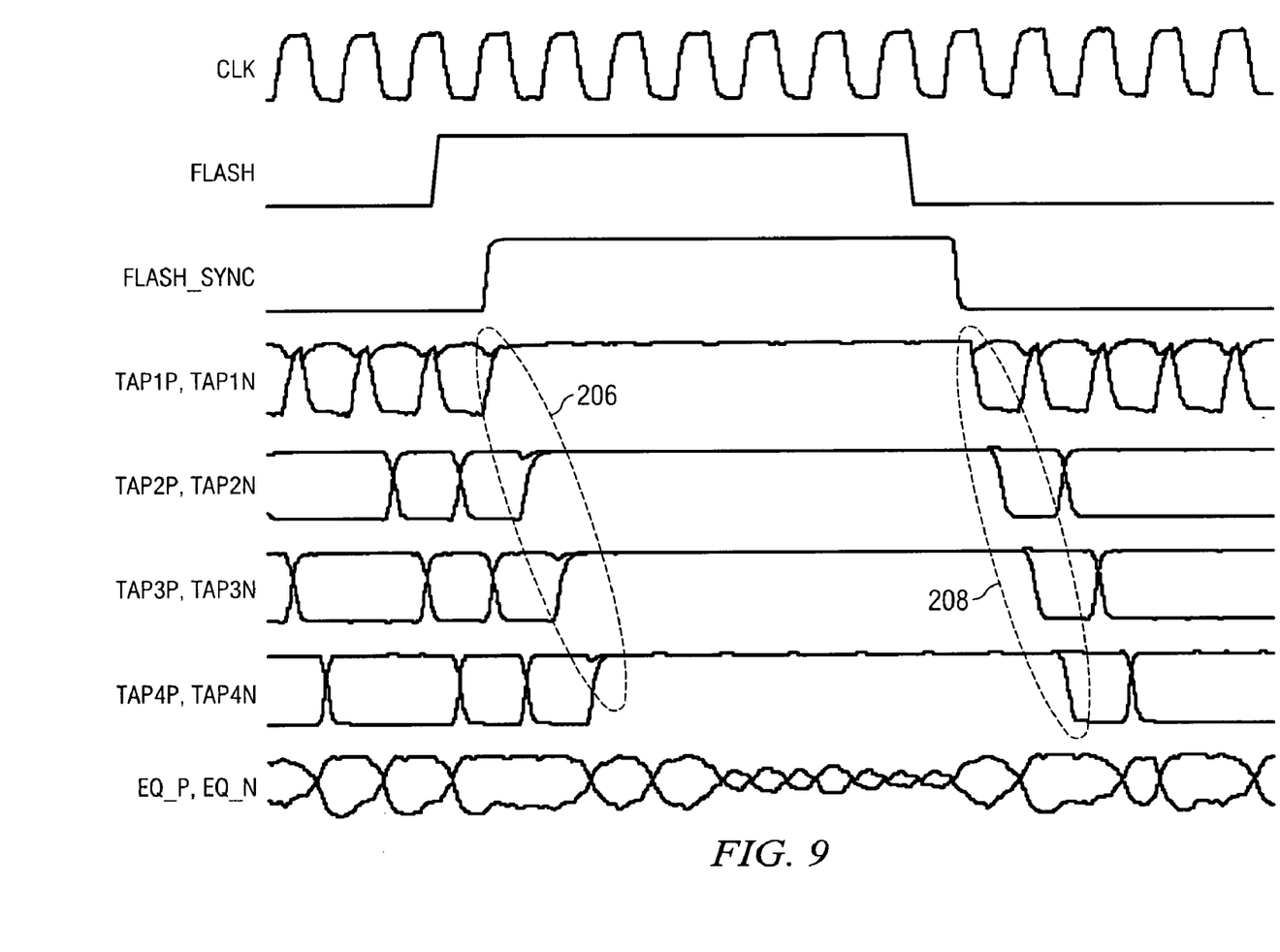
FIG. 9 shows a timing diagram illustrating synchronous DFE exit and entry.

Synchronous release of the first post-cursor symbol decision leads to smooth re-entry into the DFE-on state, in concert with an associated propagation through the various taps. The transition back to the DFE-on state is depicted in FIG. 9 at 208.

While the preferred embodiments of the present invention have been shown and described, modifications thereof can be made by one skilled in the art without departing from the spirit and teachings of the invention. The embodiments described herein are exemplary only, and are not intended to be limiting. Accordingly, the scope of protection is not limited by the description set out above.

What is claimed is:

1. An equalizer for use in a communication device, comprising:
   a sampler that samples a signal indicative of an input communication signal to determine digital decision output signals having a predetermined data rate;
   a filter that receives digital decision output signals from said sampler and generates equalization signals therefrom; and
   a summer coupled to the sampler and the filter, said summer combines together the input communication signal with the equalization signals;
   wherein a plurality of clocks control timing associated with the sampler, said clocks having frequencies that are less than a data rate of the communication device;
   wherein the equalizer includes a sensitivity test process in which an at-speed sensitivity of the equalizer can be determined, the process includes disabling an input amplifier, providing a predetermined set of tap coefficients to the filter, determining if the sampler generates a repeating pattern associated with the set of tap coefficients, and repeating the sensitivity test process with other predetermined sets of tap coefficients until the sampler no longer determines the repeating pattern associated the set of tap coefficients provided to the filter.

2. The equalizer of claim 1 wherein said clocks have frequencies that are one-half the predetermined data rate.

3. The equalizer of claim 1 wherein said clocks include two clocks that are 180 degrees out of phase with respect to each other and activate the sampler on rising edges of the two clocks.

4. The equalizer of claim 1 wherein said plurality of clocks comprise a set of quadrature clocks.

5. The equalizer of claim 4 further comprising a clock circuit coupled to said filter and said sampler, said clock circuit generates a plurality of inter-symbol interference ("ISI") cancellation clock signals that operate said filter from the set of quadrature clocks used to operate the sampler.

6. The equalizer of claim 1 wherein the filter receives unlatched digital decision output signals from said sampler.

7. The equalizer of claim 1 wherein said sampler comprises a pair of processing paths, one path for generating gradient bits and another path for generating data bits, each path comprising an amplifier and at least one sense amplifier.

8. The equalizer of claim 1 wherein the equalization signals comprise inter-symbol interference ("ISI") equalization currents and the equalizer further comprises an input amplifier coupled to the summer and having a gain and the equalizer also comprises a coefficient normalization circuit that normalizes the ISI equalization currents to the input amplifier's gain.

9. The equalizer of claim 1 wherein the filter comprises one or more taps, the sampler comprises one or more sense amplifiers, and wherein equalization can be disabled in the equalizer while preserving currents from the one or more taps by forcing the one or more sense amplifiers into a pre-charge state.

10. The equalizer of claim 9 wherein equalization can be enabled by releasing the one or more sense amplifiers from the pre-charge state.

11. An equalizer, comprising:
    a sampler that samples a signal indicative of an input communication signal to determine digital decision output signals;
    a filter that receives digital decision output signals from said sampler and generates equalization signals therefrom;
    a summer coupled to the sampler and the filter, said summer combines together the input communication signal with the equalization signals; and
    a clock circuit coupled to said filter and said sampler, said clock circuit generates a plurality of inter-symbol interference ("ISI") cancellation clock signals that operate said filter from a set of quadrature clocks used to operate the sampler;
    wherein the equalizer includes a sensitivity test process in which an at-speed sensitivity of the equalizer can be determined, the process includes disabling an input amplifier, providing a predetermined set of tap coefficients to the filter, determining if the sampler generates a repeating pattern associated with the set of tap coefficients, and repeating the sensitivity test process with other predetermined sets of tap coefficients until the sampler no longer determines the repeating pattern associated the set of tap coefficients provided to the filter.

12. The equalizer of claim 11 wherein the clock circuit comprises variable time delay elements whose time delay can be set during a calibration of the ISI cancellation clocks.

13. The equalizer of claim 11 wherein said quadrature clocks have frequencies that are less than a data rate of said digital decision output signals.

14. The equalizer of claim 11 wherein the filter receives unlatched digital decision output signals from said sampler.

15. The equalizer of claim 11 wherein said sampler comprises a pair of processing paths, one path for generating gradient bits and another path for generating data bits, each path comprising an amplifier and at least one sense amplifier.

16. The equalizer of claim 11 wherein the equalization signals comprise inter-symbol interference ("ISI") equalization currents and the equalizer further comprises an input amplifier coupled to the summer and having a gain and the equalizer also comprises a coefficient normalization circuit that normalizes the ISI equalization currents to the input amplifier's gain.

17. The equalizer of claim 11 wherein the filter comprises one or more taps, the sampler comprises one or more sense amplifiers, and wherein equalization can be disabled in the equalizer while preserving currents from the one or more taps by forcing the one or more sense amplifiers into a pre-charge state.

18. An equalizer, comprising:
an input amplifier that receives an input communication signal;
a sampler that samples a signal indicative of an input communication signal to generate digital decision output signals;
a filter that receives digital decision output signals from said sampler and generates equalization signals therefrom;
a summer coupled to the sampler and the filter, said summer combines together the input communication signal with the equalization signals; and
wherein the equalizer includes a sensitivity test process in which an at-speed sensitivity of the equalizer can be determined, the process includes disabling the input amplifier, providing a predetermined set of tap coefficients to the filter, determining if the sampler generates a repeating pattern associated with the set of tap coefficients, and repeating the sensitivity test process with other predetermined sets of tap coefficients until the sampler no longer determines the repeating pattern associated the set of tap coefficients provided to the filter.

19. The equalizer of claim 18 wherein the sets of tap coefficients are provided to the filter in order from a maximum value to a minimum value of the tap coefficients.

20. The equalizer of claim 18 wherein the filter receives unlatched digital decision output signals from said sampler.

21. The equalizer of claim 18 wherein said sampler comprises a pair of processing paths, one path for generating gradient bits and another path for generating data bits, each path comprising an amplifier and at least one sense amplifier.

22. The equalizer of claim 18 wherein the equalization signals comprise inter-symbol interference ("ISI") equalization currents and the equalizer further comprises an input amplifier coupled to the summer and having a gain and the equalizer also comprises a coefficient normalization circuit that normalizes the ISI equalization currents to the input amplifier's gain.

23. The equalizer of claim 18 wherein the filter comprises one or more taps, the sampler comprises one or more sense amplifiers, and wherein equalization can be disabled in the equalizer while preserving currents from the one or more taps by forcing the one or more sense amplifiers into a pre-charge state.

* * * * *